US009052943B2

(12) United States Patent
Bryan et al.

(10) Patent No.: US 9,052,943 B2
(45) Date of Patent: Jun. 9, 2015

(54) USING GATHERED SYSTEM ACTIVITY STATISTICS TO DETERMINE WHEN TO SCHEDULE A PROCEDURE

(71) Applicant: International Business Machines Corporation, Armonk, NY (US)

(72) Inventors: Lourie A. Bryan, Tucson, AZ (US); Henry S. Heidemann, Orrington, ME (US); Raymond A. James, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 13/864,186

(22) Filed: Apr. 16, 2013

(65) Prior Publication Data

US 2013/0232505 A1 Sep. 5, 2013

Related U.S. Application Data

(63) Continuation of application No. 13/461,395, filed on May 1, 2012, now Pat. No. 8,451,856, which is a continuation of application No. 12/871,889, filed on Aug. 30, 2010, now Pat. No. 8,442,067.

(51) Int. Cl.
*G06F 9/46* (2006.01)
*H04L 12/43* (2006.01)

(52) U.S. Cl.
CPC . *G06F 9/46* (2013.01); *H04L 12/43* (2013.01)

(58) Field of Classification Search
CPC .................................. G06F 9/46; H04L 12/43
See application file for complete search history.

(56) References Cited

U.S. PATENT DOCUMENTS

| 6,928,061 | B1* | 8/2005 | Garcia-Luna-Aceves et al. ............................. 370/329 |
| 7,352,769 | B2* | 4/2008 | Hooper et al. ................ 370/442 |
| 7,418,004 | B2* | 8/2008 | Chou ............................ 370/449 |
| 8,144,723 | B2* | 3/2012 | Bar-Ness et al. ............. 370/445 |
| 8,442,067 | B2* | 5/2013 | Bryan et al. .................. 370/458 |
| 8,451,856 | B2* | 5/2013 | Bryan et al. .................. 370/458 |
| 2003/0101383 | A1 | 5/2003 | Carlson |
| 2006/0190938 | A1 | 8/2006 | Capek et al. |
| 2008/0086734 | A1 | 4/2008 | Jensen et al. |
| 2008/0162583 | A1 | 7/2008 | Brown et al. |
| 2009/0132754 | A1 | 5/2009 | Riska et al. |
| 2010/0070237 | A1 | 3/2010 | Yitbarek et al. |

(Continued)

OTHER PUBLICATIONS

Bachmat et al., "Analysis of Methods for Scheduling Low Priority Disk Drive Tasks", ACM Sigmetrics Performance Evaluation Review, vol. 30, Issue 1, Jun. 2002, pp. 55-65.

(Continued)

*Primary Examiner* — Clemence Han
(74) *Attorney, Agent, or Firm* — David W. Victor; Konrad Raynes Davda & Victor LLP

(57) ABSTRACT

Provided are a method, system, and computer program product for using gathered system activity statistics to determine when to schedule a procedure. Selection is made of one of at least one lull window having a plurality of consecutive time slots each having an activity value lower than a threshold point comprising a low activity level among during time slots within a distribution of activity values of the time slots over recurring time periods. The procedure in the computer system is scheduled to be performed during the time slots in the lull window in a future time period.

21 Claims, 7 Drawing Sheets

(56) References Cited

U.S. PATENT DOCUMENTS

2012/0051369 A1 3/2012 Bryan et al.
2012/0233619 A1 9/2012 Bryan et al.

OTHER PUBLICATIONS

"Policy Based File System Defragmentation", IBM Corporation, IP,.com number: IPCOM000146225D, Feb. 8, 2007.
Mi et al., "Restrained Utilization of Idleness for Transparent Scheduling of Background Tasks", Sigmetrics '09: Proceedings of the 11th International Joint Conference on Measurement and Modeling of Computer Systems, Jun. 2009.
Mi et al., "Efficient Management of Idleness in Storage Systems", ACM Transaction on Storage, vol. 5, No. 2, Article 4, pp. 4-4:25, Jun. 2009.
Preliminary Amendment filed May 1, 2012 for U.S. Appl. No. 12/871,889, filed Aug. 30, 2010 by inventors L.A. Bryan, H.S. Heidemann and R.A. James (18.366).
Office Action dated Sep. 14, 2012, pp. 1-15, for U.S. Appl. No. 12/871,889, filed Aug. 30, 2010 by inventors L.A. Bryan, H.S. Heidemann and R.A. James (18.366).
Amendment dated Dec. 14, 2012, pp. 1-8, to Office Action dated Sep. 14, 2012, pp. 1-15, for U.S. Appl. No. 12/871,889, filed Aug. 30, 2010 by inventors L.A. Bryan, H.S. Heidemann and R.A. James (18.366).
Notice of Allowance dated Jan. 4, 2013, pp. 1-11, for U.S. Appl. No. 12/871,889, filed Aug. 30, 2010 by inventors L.A. Bryan, H.S. Heidemann and R.A. James (18.366).
Preliminary Amendment filed May 1, 2012 for U.S. Appl. No. 13/461,395, filed May 1, 2012 by inventors L.A. Bryan, H.S. Heidemann and R.A. James (18.366C1).
Office Action dated Sep. 26, 2012, pp. 1-15, for U.S. Appl. No. 13/461,395, filed May 1, 2012 by inventors L.A. Bryan, H.S. Heidemann and R.A. James (18.366C1).
Amendment dated Dec. 14, 2012, pp. 1-6, to Office Action dated Sep. 26, 2012, pp. 1-15, for U.S. Appl. No. 13/461,395, filed May 1, 2012 by inventors L.A. Bryan, H.S. Heidemann and R.A. James (18.366C1).
Notice of Allowance dated Jan. 4, 2013, pp. 1-11, for U.S. Appl. No. 13/461,395, filed May 1, 2012 by inventors L.A. Bryan, H.S. Heidemann and R.A. James (18.366C1).

* cited by examiner

|  | D1H0 | D1H1 | ... | D2H2H3 | D3H0 | ... | D3H2H3 | D4H0 | D4H1 | ... |
|---|---|---|---|---|---|---|---|---|---|---|
| Week 1 Activity | 3 | 7 | 8 | 1 | 0 | 13 | 2 | 2 | 3 | 15 |
| Week 2 Activity | 2 | 9 | 8 | 2 | 1 | 18 | 1 | 3 | 3 | 14 |
| Week 3 Activity | 3 | 9 | 8 | 1 | 1 | 15 | 1 | 2 | 1 | 16 |
| Week 4 Activity | 2 | 10 | 7 | 0 | 0 | 19 | 2 | 1 | 1 | 17 |
| Weekly Total Average | 2.50 | 8.75 | 7.75 | 1.00 | 0.50 | 16.25 | 1.50 | 2.00 | 2.00 | 15.5 |

FIG. 8

USING GATHERED SYSTEM ACTIVITY STATISTICS TO DETERMINE WHEN TO SCHEDULE A PROCEDURE

CROSS-REFERENCE TO RELATED APPLICATION

This application is a continuation of U.S. patent application Ser. No. 13/461,395, filed May 1, 2012, which is a continuation of U.S. patent application Ser. No. 12/871,889, filed Aug. 30, 2010, which patent applications are incorporated herein by reference in their entirety.

BACKGROUND OF THE INVENTION

1. Field of the Invention

The present invention relates to a method, system, and computer program product for using system activity to determine when to schedule a procedure.

2. Description of the Related Art

Certain computer procedures that are regularly scheduled have a significant impact on system activity and overall system performance. For instance, procedures that process large amounts of data, such as defragmentation, database reorganization, virus scans, backup, etc., can use considerable amounts of system resources and delay execution of other system operations. Programs that implement such procedures allow an administrator to select a time to perform the procedure that the administrator believes is a time of low activity. However, an administrator may not have accurate information on periods of low activity because system activity may be affected by third party users of the system, such as customers, and activity patterns may constantly change.

There is a need in the art for improved techniques for determining when to schedule a resource intensive procedure so as to minimize the effect of the procedure on overall system performance.

SUMMARY

Provided are a method, system, and computer program product for using gathered system activity statistics to determine when to schedule a procedure. Activity information is gathered in a computer readable storage medium indicating activity in a computer system during time slots for recurring time periods, wherein each time period includes a plurality of time slots. A high activity value is determined comprising an activity amount of a slot having a maximum amount of activity among the slots for the time periods and a low activity value is determined comprising an activity amount of a slot having a minimum amount of activity among the slots for the time periods. A threshold point is determined as a function of the high activity, the low activity, and a threshold percent comprising a percentage value. A determination is made as to whether there is at least one lull window having a plurality of consecutive time slots each having an activity value lower than the threshold point. A selection is made of one of the at least one lull window in response to determining that there is at least one lull window. The procedure in the computer system is scheduled to be performed during the time slots in the lull window in a future time period.

BRIEF DESCRIPTION OF THE DRAWINGS

FIG. 8 illustrates an example of gathered activity statistics and calculated expected activity amounts.

DETAILED DESCRIPTION

Figure 1:
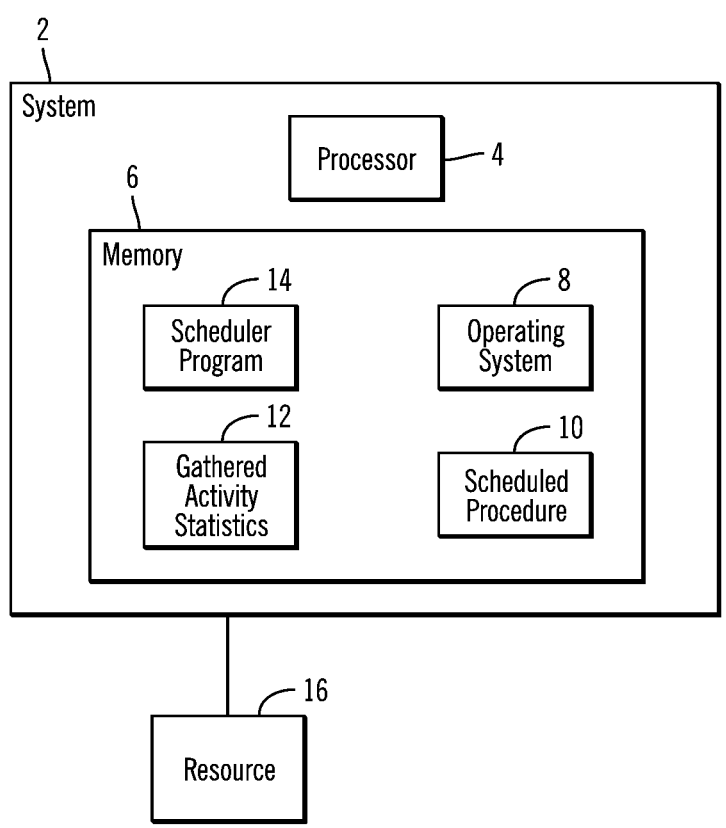
FIG. 1 illustrates an embodiment of a computing environment.

FIG. 1 illustrates an embodiment of a computer system 2 including a processor 4 comprising one or more processor devices and a memory 6, including programs 8, 10, 12, and 14, and a resource 16 coupled to the computer. The memory 6 may comprise a non-volatile working memory for the processor 4. The resource 16 may comprise a storage device, storage subsystem, database program, or any other computational resource with which the system 2 interacts and executes transactions against. For instance, the system 2 may manage database transactions against the resource 16 comprising a database program. Alternatively, the system 2 may manage Input/Output (I/O) requests against the resource 16 comprising a storage device. The resource 16 may comprise a program, such as a database program, executing within the memory 6 of the system 2 or executing external to the system 2, or a device, such as a storage system, coupled to the system 2.

The programs loaded and executed in the memory 6 include an operating system 8 to manage and schedule system 2 operations; a scheduled procedure 10 which is scheduled to execute at different predetermined times, such as a backup program, defragmentation program, reorganization program, virus scan, etc., gathered activity statistics 12 indicating system 2 activity with respect to the resource 16, such as I/O activity, database transactions, etc.; and a scheduler program 14 that uses the gathered activity statistics 12 to determine when to schedule the procedure 10. The scheduler program 14 may be comprised of one or more modules or separate programs to perform the operations described herein as ascribed to the scheduler program 14. The programs 8, 10, 12, and 14 may be loaded into the memory 6 from a non-volatile storage device (not shown) and swapped therebetween during system 2 operations.

In one embodiment, the resource 16 may comprise a database, the activity comprises database transactions with respect to the database resource 16, and the scheduled procedure 10 comprises an operation with respect to the database resource 16, such as a database reorganization, database cleaning, merging, backup, etc. In a further embodiment, the resource 16 may comprise a storage device, the activity comprises I/O transactions directed to the storage resource 16, and the scheduled procedure 10 comprises an operation with respect to the storage resource 16, such as a backup operation, mirroring operation, defragmentation, archival, etc. In a yet further embodiment, the resource 16 may comprise the computational resources of the system 2, such as processing resources, memory, etc., and the measured activity may comprise the number of threads or processes executed in the system 2, used memory, etc.

Figure 2:
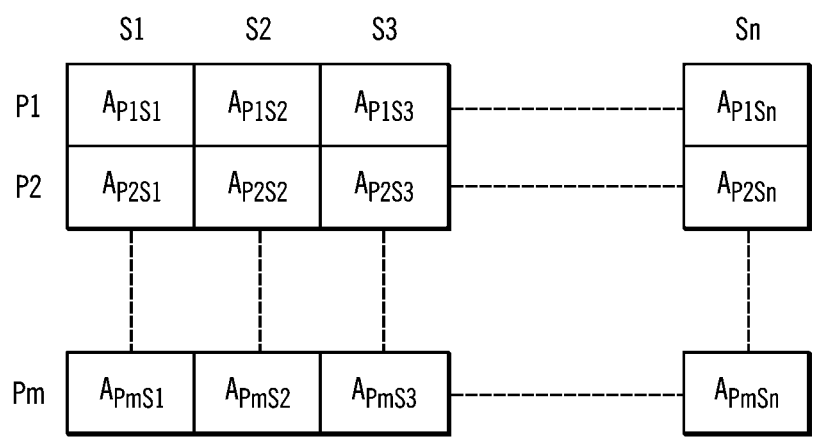
FIG. 2 illustrates an embodiment of gathered system activity amounts.

FIG. 2 illustrates an embodiment of the gathered activity statistics 12. The scheduler program 14, or some other gathering module, gathers an amount of activity, denoted as $A_{Pi,Sj}$, for a time slot S1 ... Sn during a time period P1 ... Pm. Each time period P1 ... Pm includes a same number of recurring time slots S1 . . . Sn, where each time slot S1 . . . Sn is a fixed sub-unit of time of the time period. Each time period P1 . . . Pm may be a recurring event. For instance, in one embodiment, a time period Pi may comprise a week and each time slot Sj comprises a fixed unit of time within the week, such as a day, an hour of a day, etc. For instance, if the time period Pi comprises a week and the time slots Sj comprise an hour of a day of the week, and there are time slots for each hour and day in a week, then there would be 168 time slots (7 days times 24 hours in a day). The time periods may comprise other time periods, such as a day, month, season, etc. and the time slots within one time period may comprise any subdivision of time in the time period, where each time period is organized with the same time slots at the same time instances in the time period. The scheduler program 14 gathers activity toward the resource 16 in each time slot $A_{P1,Sj}$.

Figure 3:
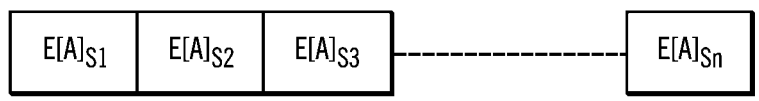
FIG. 3 illustrates an embodiment of excepted activity amounts.

FIG. 3 illustrates an embodiment of expected time slot activity values ($E[A_{Sj}]$) the scheduler program 14 would generate from the gathered activity statistics 12, such as shown in FIG. 2, for each time slot S1 . . . Sn. For instance, in one embodiment, the expected time slot activity value for a given time slot (Sj) may be determined by averaging, for a given time slot Sj, each of the time slot amounts across all time periods i=1 . . . m, e.g., $\Sigma_1^m A_{i,j}/m$. Alternative calculations may be used to determine the expected time slot activity value ($E[A_{Sj}]$) based on the activity (Ai,j) values measured for the time slots in the different time periods, such as a geometric mean, weighted average, moving average, exponential moving average (EMA, MA), median, mode, etc.

Figure 4:
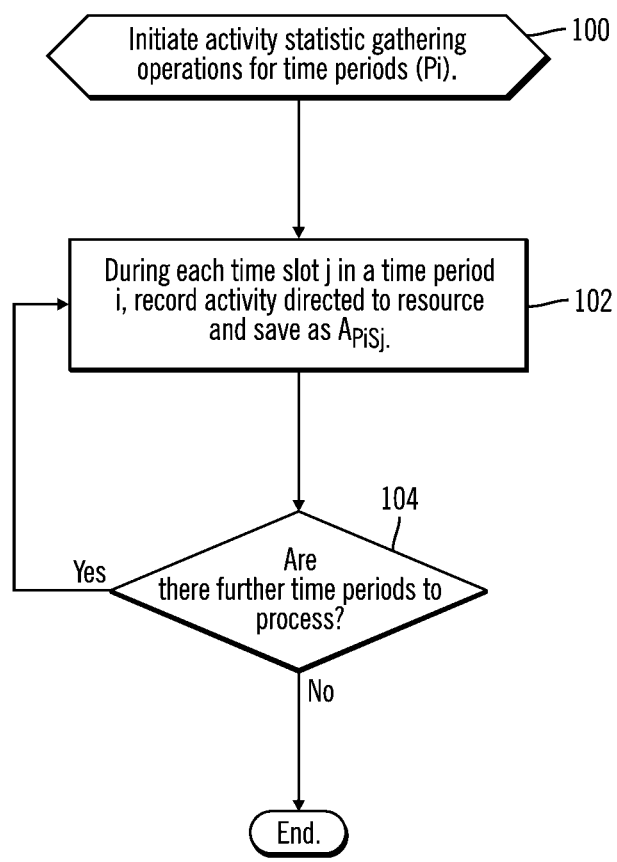
FIG. 4 illustrates an embodiment of operations to gather activity statistics for system operations.

FIG. 4 illustrates an embodiment of operations performed by the scheduler program 14 to gather statistics for system activity with respect to the resource 16. Upon initiating (at block 100) activity statistic gathering for a plurality of time periods (P1 . . . Pm), during each time slot (Sj), for j=1 . . . n, where n is the total number of time slots in a time period (P), the scheduler program 14 records (at block 102) the activity directed to the resource 16 and saves as the activity ($A_{Pi,Sj}$) for the time period Pi and time slot Sj. After recording the activity in each of the time slots (Sj) for a time period (Pi), if (at block 104) the activity statistics are to be gathered for a next time period (i+1), then control proceeds back to block 102 to record activity for the time slots (S1 . . . Sn) for the next time period that is about to occur. After recording activity information for all the time periods for which the information is to be gathered (from the no branch of block 104), control ends.

The scheduler program 14 may gather statistics for a predefined number of time periods before running the scheduled procedure 10 so that the procedure 10 may be scheduled during low activity periods. Alternatively, the scheduler program 14 may run the scheduled procedure 10 at certain predefined time periods, such as late at night, etc., until sufficient activity statistics 12 can be gathered to use to determine low activity time slots at which to schedule the procedure 10.

Figure 5:
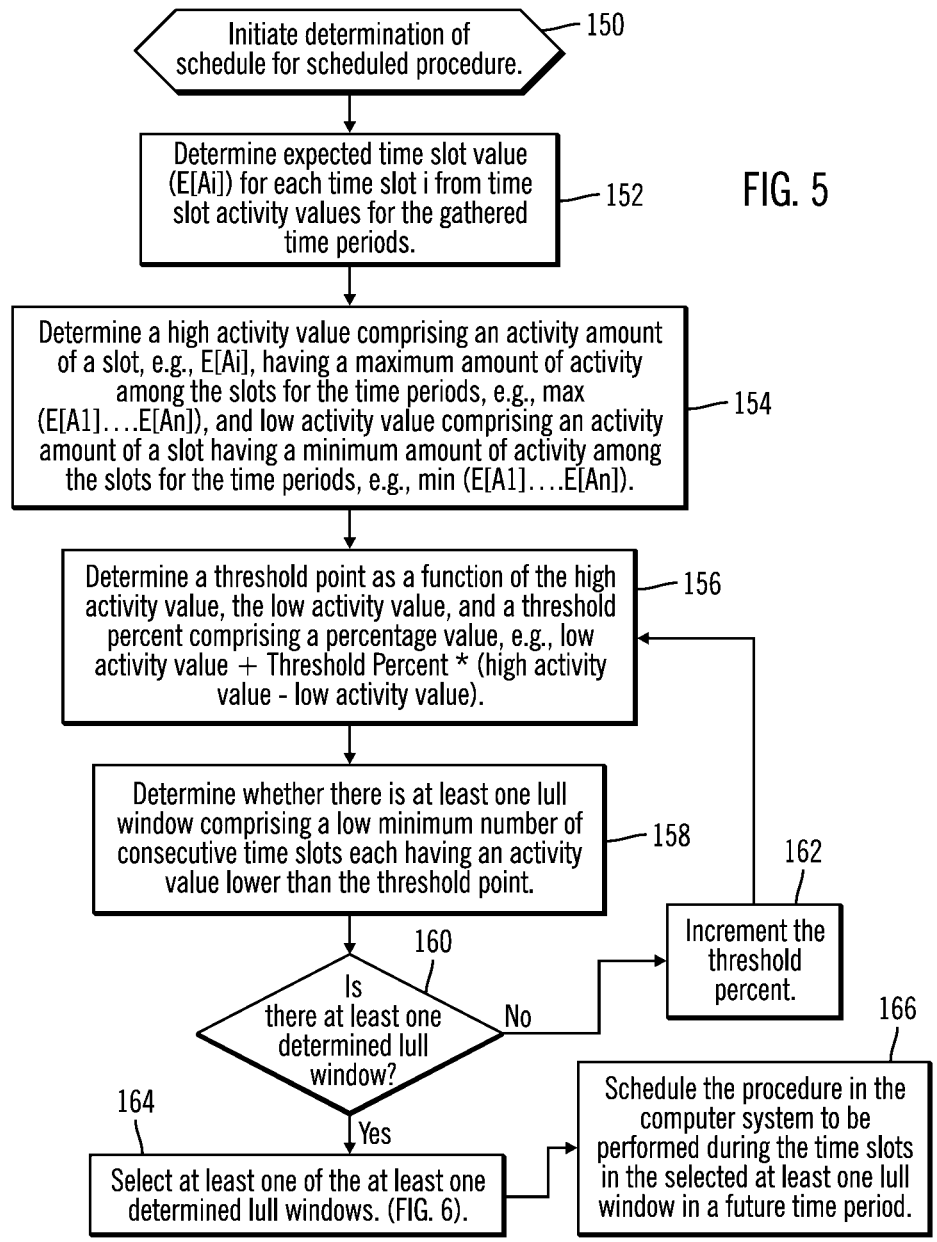
FIGS. 5 and 6 illustrate an embodiment of operations to determine time slots in which to schedule a procedure.

FIG. 5 illustrates an embodiment of operations performed by the scheduler program 14 to determine a lull window of a predetermined number of minimum time slots, the lull minimum, during which to schedule the procedure 10. Upon initiating (at block 150) the determination of the schedule for the procedure 10, the scheduler program 14 determines (at block 152) from the gathered activity statistics 12 the expected time slot value (E[Ai]), shown in FIG. 3, for each time slot i from time slot activity values ($A_{Pi,Sj}$) for the gathered time periods (P1 . . . Pm). In one embodiment, the expected time slot activity value may by determined from the activity values for a time slot j across time periods P1 . . . Pm. The scheduler program 14 determines (at block 154) a high activity value and low activity value among the time slots, such as the high and low values from the expected time slot values (E[Ai]). In one embodiment, the high activity value comprises an expected activity amount of a slot i, e.g., E[Ai], having a maximum amount of activity among the slots for the time periods, e.g., max (E[A1] . . . E[An]), and the low activity value comprises an expected activity amount of a slot having a minimum amount of activity among the slots for the time periods, e.g., min (E[A1] . . . E[An]). In an alternative embodiment, the high and low activity values may be calculated from actual activity values, not expected values of the activity values, or calculated from values derived from the gathered activity values.

The scheduler program 14 determines (at block 156) a threshold point as a function of the high activity value, the low activity value, and a threshold percent comprising a percentage value. The threshold point is set to capture a low activity level within a distribution of activity values gathered over the time periods. In one embodiment, the threshold point may be calculated according to equation (1):

$$\text{threshold\_point} = \text{low\_activity\_value} + \text{threshold\_percent} * (\text{high\_activity\_value} - \text{low\_activity\_value}) \quad (1)$$

The scheduler program 14 then determines (at block 158) whether there is at least one lull window comprising a low minimum number of consecutive time slots each having an activity value lower than the calculated threshold point. The scheduler program 14 may examine each possible lull window, or each possible combination of the low minimum number of consecutive time slot entries, i.e., those time slots consecutive in time, to determine lull windows where each of the excepted time slot values in the low window are less than or equal to the threshold point, i.e., a lull window having expected time slot values at or below the determined threshold point. Multiple lull windows may be determined.

If (at block 160) no lull window is determined, i.e., there is no lull window of consecutive expected time slot values all below (or at and below) the threshold point, then the scheduler program 14 increments (at block 162) the threshold percent and returns to block 156 et seq. to recalculate the threshold point and determine lull windows having expected time slot values below the threshold point. The threshold percent may first start out at an initial value, e.g., 5%, and then be incremented at block 162 by a fixed amount, e.g., 5%, until a lull window is determined at block 158. If (at block 160) at least one lull window is determined, then the scheduler program 14 selects (at block 164) at least one of the at least one determined lull windows. The scheduler program 14 then schedules (at block 166) the procedure 10 to be performed during the time slots in the selected at least one lull window in a future time period. For instance, if the determined lull window includes time slots A3, A4, A5, then the procedure 10 would be scheduled to occur at consecutive time slots A3, A4, A5 in one or more future time periods. For example, if the lull window includes hourly time slots 2:00 AM, 3:00 AM, and 4:00 AM on Sunday during a week time period, then the scheduler program 14 may schedule the procedure 10 on one or more following Sundays from 2:000 AM through 4:00 AM.

Figure 6:
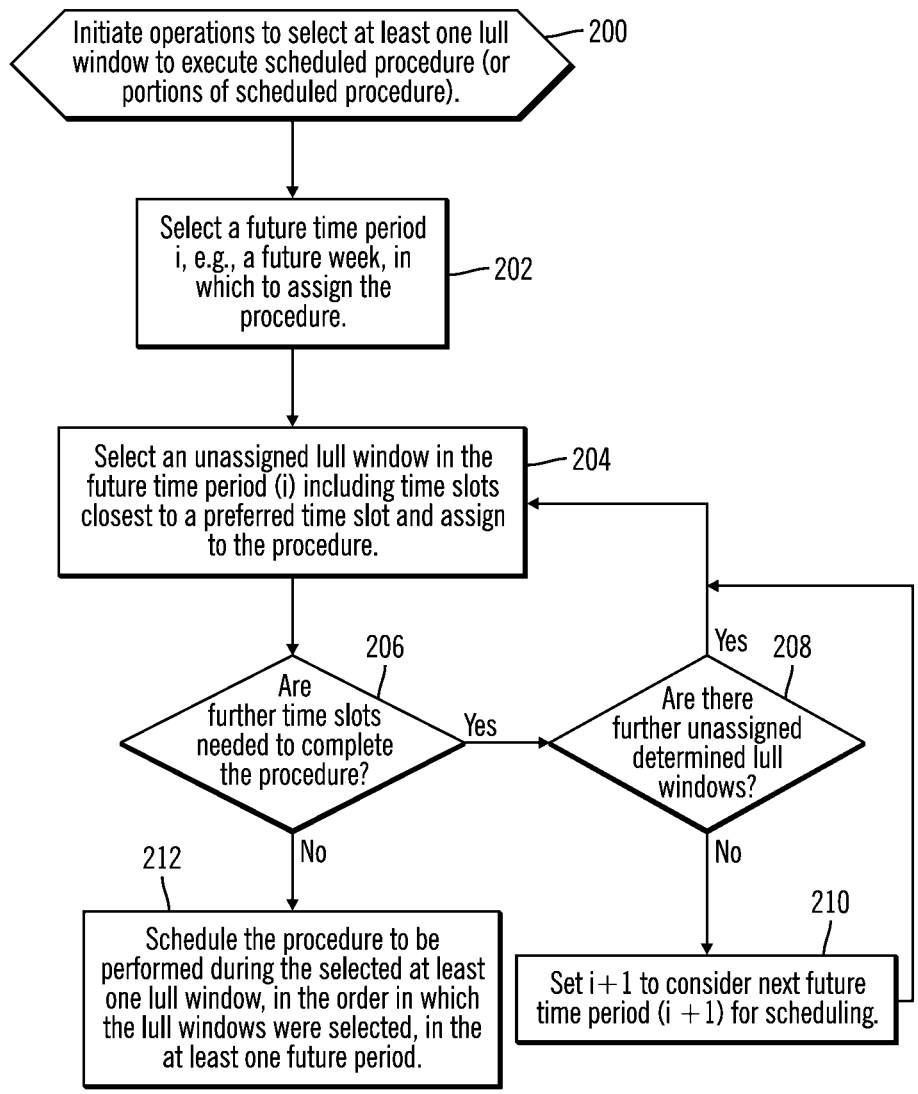

FIG. 6 illustrates an embodiment of operations performed by the scheduler program 14 to select at least one of the determined lull windows at block 164 in FIG. 5. Upon initiating (at block 200) operations to select at least one lull window during which the procedure 10 will be executed, the scheduler program 14 selects (at block 202) a future time period Pi, e.g., a future week, in which to assign the procedure 10. The scheduler program 14 selects (at block 204) an unassigned lull window in the currently considered future time period (Pi) including time slots closest to a preferred time slot and assign to the procedure. The preferred time slot may comprise a user or administrator indicated time slot which is indicated as a preferred time slot, such as a time slot the administrator believes to have low activity. The lull window "closest" to the preferred time slot may comprise a lull window including the preferred time slot or a lull window having time slots closest to the preferred time slot. If multiple lull windows have the same determined "closeness" to the preferred time slot, then the scheduler program 14 may use selection techniques known in the art to select among such multiple lull windows having a same closeness to the preferred time slot.

If (at block 206) further time slots beyond the assigned lull windows are needed to complete the procedure 10, i.e., the expected duration of the procedure exceeds the time of the time slots in the assigned lull windows, then the scheduler program 14 determines (at block 208) whether there are further unassigned determined lull windows, i.e., lull windows having time slots whose expected activity values fall below the threshold point. If (at block 208) there are further unassigned determined lull windows, then the scheduler program 14 proceeds to block 204 to select one of those unassigned lull windows to assign to the procedure 10. If (at block 208) there are no further unassigned determined lull windows, when more lull windows are needed to complete the procedure 10, then the scheduler program increments (at block 210) the time period, e.g., set i=i+1, to consider the next consecutive future time period ($P_{i+1}$) for scheduling and proceeds to block 204 to select a next lull window to assign.

After assigning enough lull windows to complete the procedure 10 (from the no branch of block 206), the scheduler program 14 schedules (at block 212) the procedure 10 to be performed during the selected and assigned at least one lull window in the at least one future time period. In one embodiment, the procedure 10 may be scheduled to be performed in the assigned lull windows in the order in which the lull windows were selected and assigned.

In one embodiment, the scheduler program 14 may perform the operations of FIGS. 5 and 6 after executing the scheduled procedure 10 so that the lull windows scheduled for a future execution of the procedure 10 are selected based on recently gathered activity statistics 12. Further, the scheduler program 14 may schedule the procedure 10 to be performed at the assigned lull windows in multiple future time periods, to execute the procedure 10 multiple times according to one determination of lull windows, and then gather activity statistics during the multiple executions of the scheduled operation 10. In such an embodiment, the rescheduling may be performed after executing the scheduled operation multiple times.

Figure 7:
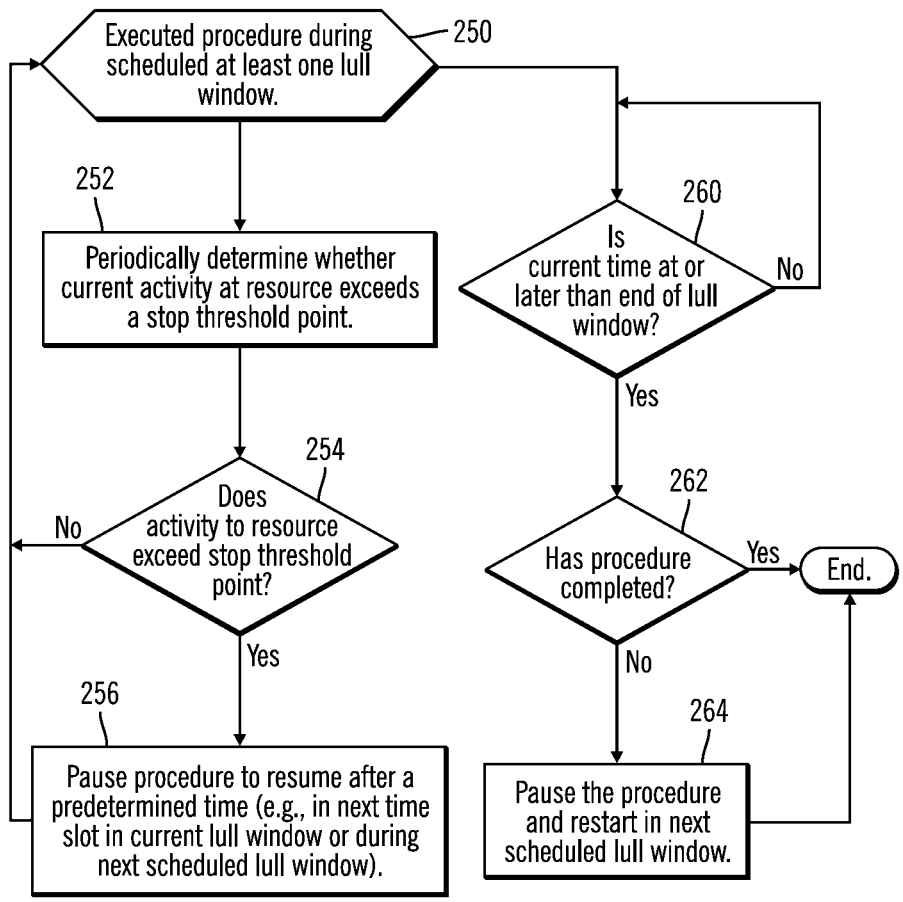
FIG. 7 illustrates an embodiment of operations to perform when executing the scheduled procedure.

FIG. 7 illustrates an embodiment of operations to perform when executing the scheduled procedure 10. Upon executing (at block 250) the scheduled procedure 10 during the scheduled at least one lull window, the scheduler program 14 periodically determines (at block 252) whether current activity at the resource 16 exceeds a stop threshold point. The stop threshold point may comprise a predetermined level of activity. In one embodiment, the stop threshold point may be calculated from the gathered activity statistics 12, such as a percentage, e.g., 50%, of the difference of the high activity value and low activity value, calculated as described with respect to block 154 of FIG. 5. If (at block 254) the current activity exceeds the stop threshold point, then the scheduler program 14 pauses (at block 256) the procedure 10 to resume after a predetermined time (e.g., next time slot, one hour later, in next time slot in current lull window or during next scheduled lull window, etc.). If (from the no branch of block 254) the stop threshold point is not exceeded, then the system 2 continues executing the procedure 10.

Further, during execution of the procedure 10 (at block 250), if (at block 260) the current time is at or later than the end of the current lull window in which the procedure 10 is executing and if (at block 262) the procedure has not completed, then the scheduler program 14 pauses (at block 264) the procedure 10 and restarts in next scheduled lull window. If the procedure 10 has completed, then control ends. If the current time is within the lull window (from the no branch of block 260), then the system 2 continues executing the procedure.

FIG. 8 illustrates an example of a table 300 of activity statistics gathered over a period of four weeks, where the time slots comprise an hour of a day within the week time period, providing a total of 168 time slots. The final row 302 of the statistics table 300 includes an average for each time slot of the time slot values across the gathered four weeks of activity. The selected lull window 304 to assign to the procedure 10 has the time slots having the lowest average activity values, where the lull minimum is three.

Described embodiments provide techniques for selecting a lull window of time slots to schedule a procedure based on gathered activity statistics in the system in which the procedure will be executed. By basing the scheduling decision on actual gathered activity statistics, including a high and low activity levels, the scheduler program is able to select a lull window during which to schedule the procedure that is during an empirically determined low activity period. Further, in certain embodiments, the activity level may be continually monitored during execution of the procedure to gather activity statistics and to pause the procedure if the current activity level exceeds a stop threshold.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 1 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for determining a time to schedule a procedure in a computer system, the computer program product comprising a computer readable storage medium having computer readable program code embodied therein that executes to perform operations, the operations comprising:
    selecting one of at least one lull window having a plurality of consecutive time slots each having an activity value lower than a threshold point comprising a low activity level among time slots within a distribution of activity values of the time slots over recurring time periods; and
    scheduling the procedure in the computer system to be performed during the time slots in the lull window in a future time period.

2. The computer program product of claim 1, wherein the time periods comprise weekly time periods and wherein each time slot comprises at least one hour during the weekly time period.

3. The computer program product of claim 1, wherein the low activity level is a function of a low activity value comprising an activity value for a time slot having a minimum amount of activity for the recurring time periods.

4. The computer program product of claim 1, wherein the operations further comprise:
    increasing the threshold point in response to determining that there is not at least one lull window having time slots having activity values lower than the threshold point; and
    in response to increasing the threshold point, performing an additional iteration of determining the threshold point until a determination is made of one lull window to select to schedule the procedure.

5. The computer program product of claim 1, wherein scheduling the procedure comprises:
    scheduling portions of the procedure to occur in the determined lull window across multiple future time periods in response to determining that the lull window in the time period does not include enough time slots to complete the procedure within one time period; and
    scheduling portions of the procedure to occur in the determined at least one lull window within one future time period in response to determining that the at least one determined lull window includes enough time slots to complete the procedure in one time period.

6. The computer program product of claim 1, wherein the operations further comprise:
    pausing the scheduled procedure in response to determining that the activity in the computer system exceeds a stop point threshold; and
    resuming the scheduler procedure after a predetermined time in response to pausing the scheduler procedure.

7. The computer program product of claim 1, wherein the operations further comprise:
    pausing the scheduled procedure in response to determining that the procedure is executing outside of the lull window scheduled for the procedure; and
    restarting the procedure in a next scheduled lull window for the procedure.

8. A system, comprising:
    a processor;
    a computer readable storage medium including executed by the processor to perform operations, the operations comprising:
        selecting one of at least one lull window having a plurality of consecutive time slots each having an activity value lower than a threshold point comprising a low activity level among time slots within a distribution of activity values of the time slots over recurring time periods; and
        scheduling the procedure in the computer system to be performed during the time slots in the lull window in a future time period.

9. The system of claim 8, wherein the time periods comprise weekly time periods and wherein each time slot comprises at least one hour during the weekly time period.

10. The system of claim 8, wherein the low activity level is a function of a low activity value comprising an activity value for a time slot having a minimum amount of activity for the recurring time periods.

11. The system of claim 8, wherein the operations further comprise:
    increasing the threshold point in response to determining that there is not at least one lull window having time slots having activity values lower than the threshold point; and
    in response to increasing the threshold point, performing an additional iteration of determining the threshold point until a determination is made of one lull window to select to schedule the procedure.

12. The system of claim 8, wherein scheduling the procedure comprises:
    scheduling portions of the procedure to occur in the determined lull window across multiple future time periods in response to determining that the lull window in the time period does not include enough time slots to complete the procedure within one time period; and
    scheduling portions of the procedure to occur in the determined at least one lull window within one future time period in response to determining that the at least one determined lull window includes enough time slots to complete the procedure in one time period.

13. The system of claim 8, wherein the operations further comprise:
    pausing the scheduled procedure in response to determining that the activity in the computer system exceeds a stop point threshold; and
    resuming the scheduler procedure after a predetermined time in response to pausing the scheduler procedure.

14. The system of claim 8, wherein the operations further comprise:
    pausing the scheduled procedure in response to determining that the procedure is executing outside of the lull window scheduled for the procedure; and
    restarting the procedure in a next scheduled lull window for the procedure.

15. A computer implemented method, comprising:
- selecting one of at least one lull window having a plurality of consecutive time slots each having an activity value lower than a threshold point comprising a low activity level among time slots within a distribution of activity values of the time slots over recurring time periods; and
- scheduling the procedure in the computer system to be performed during the time slots in the lull window in a future time period.

16. The method of claim 15, wherein the time periods comprise weekly time periods and wherein each time slot comprises at least one hour during the weekly time period.

17. The method of claim 15, wherein the low activity level is a function of a low activity value comprising an activity value for a time slot having a minimum amount of activity for the recurring time periods.

18. The method of claim 15, further comprising:
- increasing the threshold point in response to determining that there is not at least one lull window having time slots having activity values lower than the threshold point; and
- in response to increasing the threshold point, performing an additional iteration of determining the threshold point until a determination is made of one lull window to select to schedule the procedure.

19. The method of claim 15, wherein scheduling the procedure comprises:
- scheduling portions of the procedure to occur in the determined lull window across multiple future time periods in response to determining that the lull window in the time period does not include enough time slots to complete the procedure within one time period; and
- scheduling portions of the procedure to occur in the determined at least one lull window within one future time period in response to determining that the at least one determined lull window includes enough time slots to complete the procedure in one time period.

20. The method of claim 15, further comprising:
- pausing the scheduled procedure in response to determining that the activity in the computer system exceeds a stop point threshold; and
- resuming the scheduler procedure after a predetermined time in response to pausing the scheduler procedure.

21. The method of claim 15, further comprising:
- pausing the scheduled procedure in response to determining that the procedure is executing outside of the lull window scheduled for the procedure; and
- restarting the procedure in a next scheduled lull window for the procedure.

* * * * *